United States Patent
Sambamurthy et al.

(10) Patent No.: US 8,812,464 B2
(45) Date of Patent: Aug. 19, 2014

(54) CONTENT MANAGEMENT SYSTEM AND METHOD OF MANAGING RETENTION AND DISPOSITION OF CONTENT ITEMS

(75) Inventors: Govinda Raj Sambamurthy, Bangalore (IN); Hari Charan Ramachandra Rao, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 16 days.

(21) Appl. No.: 13/484,019

(22) Filed: May 30, 2012

(65) Prior Publication Data

US 2013/0325822 A1  Dec. 5, 2013

(51) Int. Cl.
G06F 7/00 (2006.01)
G06F 17/00 (2006.01)

(52) U.S. Cl.
USPC .......................................... 707/694

(58) Field of Classification Search
USPC ........................................ 707/694, 999.204
See application file for complete search history.

(56) References Cited

U.S. PATENT DOCUMENTS

| | | | |
|---|---|---|---|
| 6,915,435 B1 | 7/2005 | Merriam | |
| 7,107,416 B2 | 9/2006 | Stuart et al. | |
| 7,680,830 B1 | 3/2010 | Ohr et al. | |
| 7,720,825 B2 | 5/2010 | Pelletier et al. | |
| 7,831,567 B2 | 11/2010 | Luther et al. | |
| 7,970,743 B1 | 6/2011 | Kilday et al. | |
| 2006/0004689 A1 | 1/2006 | Chandrasekaran et al. | |
| 2006/0156382 A1 | 7/2006 | Motoyama | |
| 2007/0192360 A1* | 8/2007 | Prahlad et al. | 707/103 R |
| 2007/0239715 A1 | 10/2007 | DeBie | |
| 2009/0112678 A1 | 4/2009 | Luzardo | |
| 2011/0153578 A1 | 6/2011 | Pogodin | |
| 2012/0089791 A1* | 4/2012 | Oberhofer et al. | 711/154 |

OTHER PUBLICATIONS

Oracle International Coporation, Oracle Universal Content Management 2, 16 pages.
Oracle International Coporation, Oracle Records Management 4, 4 pages.
Sprehe, A Framework for EDMS/ERMS Integration, The Information Management Journal, Nov./Dec. 2004, pp. 54-62.
SPREHE, Enterprise Records Management: Strategies and Solutions, A White Paper prepared for Hummingbird Ltd., Sep. 2002, 23 pages.
Sun Microsystems, Information Lifecycle Management, A Business Brief, Jan. 2005, 11 pages.

* cited by examiner

*Primary Examiner* — Aleksandr Kerzhner
(74) *Attorney, Agent, or Firm* — Meyer IP Law Group

(57) ABSTRACT

In specific embodiments, a content management system operable on one or more microprocessors comprises a content repository storing a plurality of content items and a content usage analyzer. The computer is usable to perform one or more operations on one or more contents items stored in the content repository, and when an operation is performed on a content item, audit data is captured related to the operation. The content usage analyzer is configured to identify an idle content item within the content repository based on the captured audit data.

17 Claims, 2 Drawing Sheets

CONTENT MANAGEMENT SYSTEM AND METHOD OF MANAGING RETENTION AND DISPOSITION OF CONTENT ITEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to content management systems and methods, and is particularly related to content retention in content management systems.

BACKGROUND

Enterprise Content Management ("ECM") is the strategies, methods and tools used to capture, manage, store, preserve, and deliver content and documents related to organizational processes. ECM covers the management of information within the entire scope of an enterprise whether that information is in the form of a paper document, an electronic file, a database print stream, or even an email. ECM encompasses document management, web content management, search, collaboration, records management, digital asset management, work-flow management, capture and scanning.

ECM is necessary to an organization for several reasons. One reason is the need to comply with regulations such as Sarbanes-Oxley or the Health Insurance Portability and Accountability Act. A proper compliance strategy ensures that proper business practices are followed and that content is properly captured, stored, managed, and disposed of at the appropriate and legal time in its lifecycle. Another reason is to effectively enable collaboration between individuals. Strong collaboration requires utilizing technologies (e.g. instant messaging, whiteboards, online meetings, email) that allow work to take place wherever and whenever needed. Another reason is to improve an organization's efficiency and drive down the cost of doing business by, for example, reducing business process delays and improving customer service interactions.

ECM is primarily aimed at managing the life-cycle of information from initial publication or creation all the way through archival and eventually disposal. ECM applications are delivered in three ways: on-premise software (installed on the organization's own network), Software-as-a-Service (web access to information that is stored on a vendor's system), or a hybrid solution composed of both on-premise and off-premise components. ECM aims to make the management of corporate information easier through simplifying storage, security, version control, process routing, and retention. The benefits to an organization include improved efficiency, better control, and reduced costs.

SUMMARY

In accordance with an embodiment of the invention, a content management system comprises a content usage analyzer and a content repository storing a plurality of content items. A computer or a computing device such as a tablet personal computer (PC), smart phone or any handheld device can be used to access the content management system and perform one or more operations on one or more contents items stored in the content repository. When an operation is performed on a content item, audit data is captured related to the operation. The content usage analyzer identifies an idle content item within the content repository based on the captured audit data.

In some embodiments of the invention, the content management system can determine, after an analysis trigger, a content usage pattern of the content items of the content repository based on the captured audit data. And idle content item within the content repository can then be identified based on the content usage pattern.

In some embodiments of the invention, the content management system further comprises a content usage repository for storing captured audit data, and a content usage policy file including rules usable by the content usage analyzer to identify the idle content item. In some embodiments of the invention, the content usage repository is a component of the content repository. In some embodiments of the invention, one or more of the rules of the content usage policy can be defined by a responsible party, such as a system administrator, a content generator, and/or a content owner.

In some embodiments of the invention, the content management system further comprises a workflow that can be triggered for reporting idle content items to responsible parties. The workflow allows the responsible party to indicate that the idle content item is to be dispositioned or that the idle content item is a false positive. The content management system further comprises a feedback loop for modifying the analysis of the content usage analyzer to exclude identifying the content item as an idle content item or to exclude identifying a group of content items having similar metadata or taxonomy as idle content items based on the false positive indicated by the responsible party. In some embodiments of the invention, when the workflow is triggered it recommends a disposition action to the responsible party. The workflow allows the responsible party to accept the recommended disposition action or request an alternative disposition action. Disposition actions can include, but are not limited to, deleting the idle content item from the content repository, archiving the idle content item in a secondary storage, and/or recycling the content item for the next analysis trigger.

In some embodiments of the invention, a method of identifying an idle content item within a content management system comprises accessing the content management system, capturing audit data related to operations performed on content items stored in a content repository, analyzing the captured audit data, and identifying an idle content item based on the analysis. The content management system includes a content usage analyzer that performs the analysis on the captured audit data.

In some embodiments of the invention, the method further comprises storing captured audit data in a content usage repository and analyzing the captured audit data after an analysis trigger for each of the content items stored in the content repository. The content usage repository can be a component of the content management system, and can optionally be a component of the content repository.

In some embodiments of the invention, the method comprises accessing a content usage policy file of the content management system, so that the content usage analyzer can use rules contained therein to identify an idle content item or a group of idle content items based on metadata or taxonomy.

Optionally, the content usage policy file can also include the analysis trigger that causes the content usage analyzer to perform an analysis.

In some embodiments of the invention, the method further comprises generating a workflow informing a responsible party of the idle content item. In some embodiments of the invention, the workflow can allow the responsible party to indicate that the idle content item is to be dispositioned or to indicate that the idle content item is a false positive. In such embodiments, the method modifies the content usage file, in the event of a false positive, to generate a rule excluding the idle content item from being identified in a further analysis as an idle content item and/or excluding a group of content items having common metadata or taxonomy as the idle content item from being identified as idle content items.

In some embodiments of the invention, the method further comprises receiving, from the responsible party, an instruction to perform a disposition action on the idle content item. The disposition action is then performed on the idle content item. The disposition action can include, but is not limited to, deleting the idle content item from the content repository, archiving the idle content item in secondary storage, and recycling the content item for the next analysis trigger.

DETAILED DESCRIPTION

Figure 1:
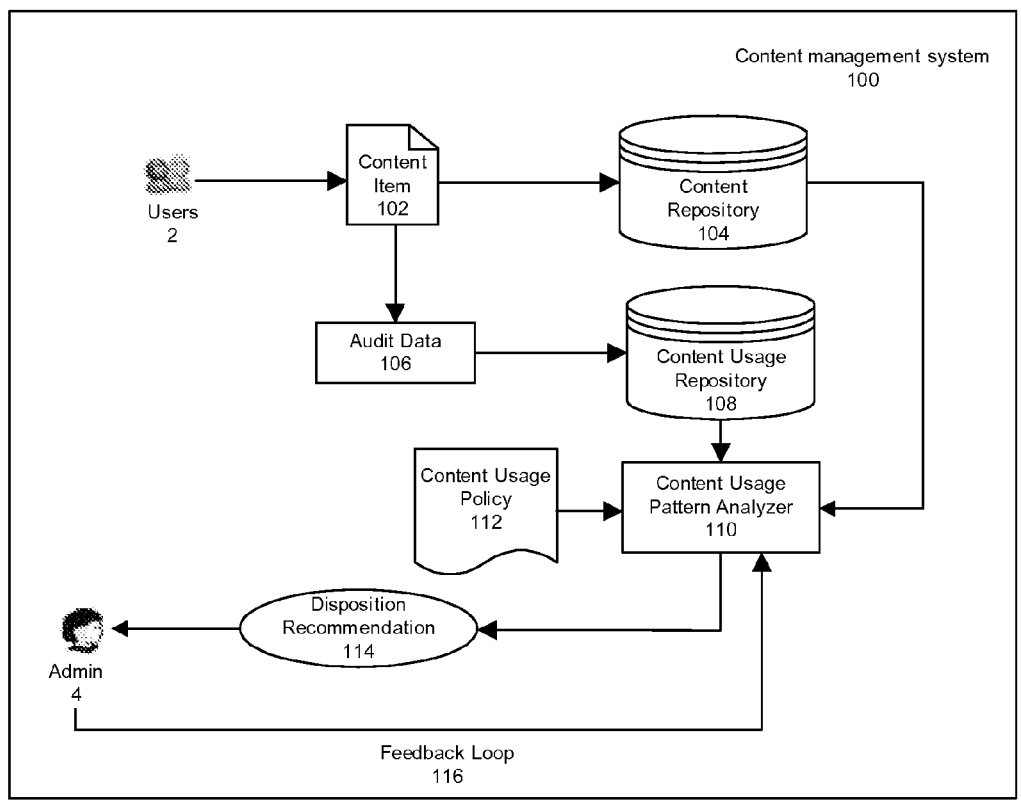
FIG. 1 shows an illustration of a content management system that includes content usage pattern analysis features in accordance with an embodiment of the present invention.

Content management systems, including ECM systems, often provide the ability to define and execute content retention and disposition policies. For example, ORACLE® ECM suite includes the ability to define and execute content retention and disposition policies as part of its records management features. Retention policies indicate how long a particular content item must be stored in a content management repository. Retention policies can be governed by statutory compliance laws. For example, 17 CFR §210.2-06 of the Sarbanes-Oxley Act requires that work papers and other documents produced by an accountant and that forms the basis of an audit or review, including memos, correspondence and email which contain opinions, analysis or financial data, including those that are inconsistent with the auditor's final opinion, be retained for a period of seven years. Retention policies can also be governed by a corporate-wide information retention policy. Disposition policies indicate what is to be done with a particular content item when a retention schedule of the content item has lapsed. Often, the content item is automatically destroyed or placed in a secondary storage. Alternatively, a workflow process can be triggered so that approval by a responsible party is required to determine the nature of, and proceed with, the disposition of the content item.

While retention schedules based on retention policies are associated with some content items, many more content items do not fall within a regulatory regime and are not otherwise provided with retention schedules by defined rules. Such content items rely on the creator, author, revisionist, or editor of the content item (referred to herein collectively as the generator of the content item) to provide a retention schedule. It may be impractical to make mandatory the attachment of retention schedules to all content items in most content management systems, because the generator of the content item may not necessarily know how long the content item should be stored in a content repository. Deletion or other disposition of out-dated content items is typically not a concern for generators of content items. As a result, many of the content items stored within a content repository are not removed from the content repository and content items accumulate, causing the content repository to expand in volume. For a content administrator, an ever larger content repository can lead to a greater administrative overhead, for example with the need to continuously expand capacity, to continuously attend to disk partitioning, and to continuously index content. For end users searching for content items within the content management system, the accumulation of content items can cause the content management system to return search results which are outdated or irrelevant to the end user's intended search query. For example, if the content item retained within a content management system is a sales document for an obsolete product, the content item may show up in an irrelevant search context. Such a scenario can lead to misinformation for a sales executive who might see the sales document and contact possible leads for a sales pitch. Or, for example, if the content item retained within a content management system is a design document that is ten years old, it may not be of much use to a searcher requiring the latest revision of the design document.

Removal of outdated content items from the content repository based on content usage patterns can reduce administrative overhead of the content management system, improve the content management system's usability by relieving the content generator and/or administrator of the responsibility of defining a retention schedule for each content item, and can improve the content management system's performance by reducing irrelevant search results presented to a user performing a search operation within the content management system.

Referring to FIG. 1, an embodiment of a content management system in accordance with the present invention capable of identifying a content item within a content repository that may not have a retention schedule, but which may be a candidate for removal from the content repository (also referred to herein as an idle content item) is shown. Users 2 access a content item 102, which can be stored in a content repository 104 of the content management system 100. The content repository 104 can be a database or file store provider maintained in any storage medium local, adjacent to or remote from a server, or other computing device that facilitates access to the content item 102. An idle content item can be identified based on the usage pattern of the content item. A usage pattern of a content item can be determined based on a dedicated content tracking feature, or alternatively can be determined based on audit data.

As users 2 perform content operations on a content item 102, data related to the operations are captured as audit data 106 within the content management system 100. Audit data 106 related to a content operation include a trail of what happened to the content item and can include such information as the name of the content item, the content operation performed on the content item, the identification of the user that performed the content operation, the time the content operation was performed, etc. Content operations can include, but are not limited to, such operations as check in, update, edit, print, save, view, archive, modify metadata (e.g., update the taxonomy of metadata), content conversion, and delete. Content operations can also include the addition of documents to the content repository 104. Content operations can even include moving a content item or shortcuts from one folder in a directory to another folder in the same or a different directory. An audit feature of the content management system 100, such as an audit framework, can capture all data related to content access.

In currently available content management systems, audit data is used only passively (i.e. for reporting purposes in compliance with regulations). Embodiments of content management systems in accordance with the present invention can store and analyze audit data to determine usage patterns, rather than simply reporting the audit data. Referring again to FIG. 1, the content management system 100 comprises a content usage repository 108 for storing audit data 106 and a content usage pattern analyzer 110. Some or all of the audit data 106 can be stored in the content usage repository 108. The content usage repository 108 can optionally be part of the content repository 104. The content usage pattern analyzer 110 periodically fetches the audit data 106 from the content usage repository 108 to perform an analysis of usage patterns of the content items within the content repository 104. The periodicity can be based on an analysis trigger. In some embodiments, the analysis trigger is defined by rules provided in a content usage policy file 112, which is provided as an input to the content usage pattern analyzer 110. In other embodiments, the analysis trigger is an instruction from an administrator.

The content usage pattern analyzer 110 generates a list of idle content items identified based on the analysis of the usage patterns of the content items. The content items qualify as idle content items when their usage patterns meet conditions. Conditions can include, for example, the content item not being accessed or modified over a threshold period of time. Conditions under which a specific content item is identified can be defined by rules contained in the content usage policy file 112. Content items can qualify under conditions defined by rule for a group of content items based on similar metadata or taxonomy. Further, a content item can qualify under conditions defined by rule for different operations. For example, a finance department can choose to identify as idle content items all financial documents which have not been modified in the past five years, and identify as idle content items financial documents which have not been accessed in the last three years. Conditions can be as granular as capability allows, and can depend on the information that can be extracted from audit data or other content tracking data. For example, where the content item exists as an html source, audit data associated with accessing the content item may include a length of time of access, i.e., how long the content item was accessed. If the content item was deemed mistakenly accessed, for example if the content item is only accessed briefly, a false search result can be implied and the content usage pattern analyzer 110 can be instructed to ignore such an operation.

Once the list of idle content items has been generated, the content usage pattern analyzer 110 triggers a workflow with a disposition recommendation to an administrator 4, or to another responsible party, such as the content generator or a content owner. For each idle content item, the administrator 4 can choose to accept a recommendation from the content usage pattern analyzer 110 to proceed with a disposition action, the administrator 4 can choose to proceed with a different disposition action, or the administrator 4 can flag the disposition recommendation from the content usage pattern analyzer 110 as a false positive (i.e. a content item that was identified as idle, but which should not have been identified as idle). Disposition actions can be governed by rules defined in the content policy file 112. Disposition actions can include, for example, complete deletion of the file from the content repository, archival of the content item and secondary storage of the archived item, such as on a tape or other secondary storage device, or recycle of the content item for the next analysis trigger.

Content items flagged as false positives are provided to the content usage pattern analyzer 110 via a feedback loop 116 so that in subsequent analysis runs, specific content items and/or content items which have similar metadata or taxonomy, are ignored and/or are provided to the administrator 4 in a separate "white" list. Further, the administrator 4 can also choose not to act on the recommendation temporarily and postpone the decision to a future date. The administrator 4 (or responsible party) can optionally define retention schedules or otherwise provide instructions for the analysis of specific content items and/or groups of content items having specific metadata within the content usage policy file 112. For example, an administrator can input into the content usage policy file 112 a rule pre-defining a retention schedule of income tax returns as spanning five years, and a rule defining disposition after the five years as including the removal of the income tax return from the content repository without placing the income tax return in secondary storage. The content usage policy file can be configured in a myriad of different ways. For example, the content usage policy file can be accessed by the administrator using a graphical user interface ("GUI") which internally creates the content policy file, or the content usage policy can be configured declaratively through xml configuration.

Figure 2:
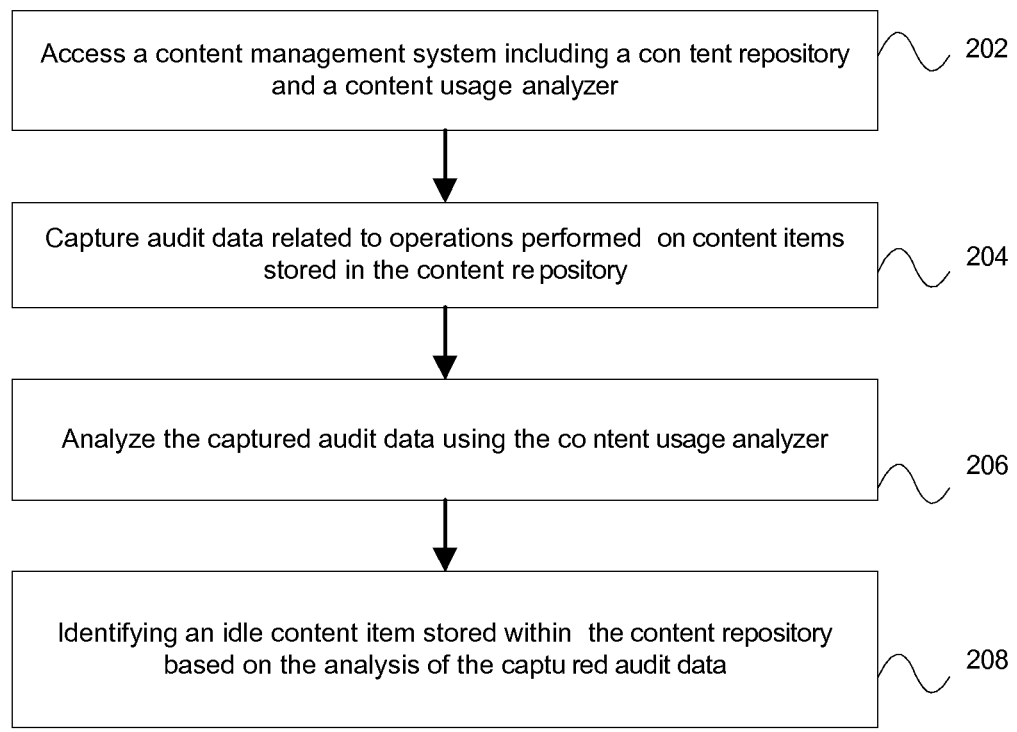
FIG. 2 shows a flowchart of a method of identifying a content item within a content repository for disposition in accordance with an embodiment of the present invention.

FIG. 2 is a flowchart of a method of identifying an idle content item within a content management system in accordance with an embodiment of the present invention. The content manager includes a content repository and a content usage pattern analyzer. As the content manager is accessed (Step 202), audit data related to operations performed on content items stored in the content repository are captured (Step 204). The audit data can be captured, for example, by an audit framework within the content management system. The captured audit data are stored in a content usage repository (Step 204). The content usage repository can be a component of the content repository, or can be separate from the content repository. The content usage analyzer analyzes the audit data (Step 206) and identifies an idle content item stored within the content repository based on the analysis of the captured audit data (Step 208). The analysis can be performed based on a pre-defined analysis trigger or the analysis can be triggered, for example by an administrator. The idle content item is flagged as potentially removable from the content repository. The identified idle content item can be reported to a responsible party, such as a content administrator, content generator, or content owner, optionally along with a recommended disposition action. The responsible party can determine the appropriate disposition action for the idle content item. Disposition actions can include, for example, complete deletion of the file from the content repository, archival of the content item in secondary storage, such as on a tape or other secondary storage device, or recycle of the content item for the next analysis trigger.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A content management system operable on one or more microprocessors, the content management system comprising:
    a content repository adapted to store a plurality of content items;
    a content usage analyzer;
    wherein when an operation of one or more operation types is performed on a content item from the content repository, audit data is captured related to the operation and stored separately from the content item;
    wherein captured audit data for each operation is individually stored;
    wherein the content usage analyzer is configured to determine a content usage pattern, over time, of the content items of the content repository based on the individually stored audit data in response to a time-based analysis trigger;
    wherein an idle content item within the content repository is identifiable based on the content usage pattern.

2. The content management system of claim 1, further comprising:
    a content usage repository; and
    a content usage policy file;
    wherein the captured audit data is stored in the content usage repository; and
    wherein the content usage policy file includes rules usable by the content usage analyzer to identify the idle content item.

3. The content management system of claim 2, wherein the content usage repository is a component of the content repository.

4. The content management system of claim 2, wherein one or more of the rules of the content usage policy is definable by one or more of an administrator, a content generator, and a content owner.

5. The content management system of claim 1, further comprising:
    a workflow triggerable for reporting an idle content item to a responsible party;
    wherein the workflow allows the responsible party to indicate that the idle content item is to be dispositioned or is a false positive; and
    a feedback loop for modifying the analysis of the content usage analyzer to exclude identifying the content item as an idle content item or a group of content items having similar metadata or taxonomy as idle content items based on the false positive.

6. The content management system of claim 5, wherein when the workflow is triggered, the workflow recommends a disposition action to the responsible party;
    wherein the workflow allows the responsible party to accept the recommended disposition action or request an alternative disposition action; and
    wherein the disposition action is one of deleting the idle content item from the content repository, archiving the idle content item in secondary storage, and recycling the content item for the next analysis trigger.

7. A method of identifying an idle content item within a content management system operable on one or more microprocessors, the method comprising:
    accessing the content management system, wherein the content management system includes a content repository and a content usage analyzer;
    capturing audit data related to operations performed on content items stored in the content repository and storing the captured audit data separately from the content items;
    storing the captured audit data for each individual operation;
    analyzing the captured audit data, in response to a time-based analysis trigger, using the content usage analyzer to determine a content usage pattern, over time, of the content items of the content repository based on the individually stored audit data; and
    identifying an idle content item stored within the content repository based on the content usage pattern.

8. The method of claim 7, further comprising:
    generating a workflow informing a responsible party of the idle content item.

9. The method of claim 7, wherein the content management system includes a content usage policy file; and
    wherein analyzing the audit data for each of the content items further includes accessing the content usage policy file; and
    wherein the content usage policy file includes rules usable by the content usage analyzer to identify the idle content item.

10. The method of claim 7, wherein the content management system includes a content usage policy file; and
    wherein the analysis trigger is defined by the content usage policy file.

11. The method of claim 9, further comprising:
    generating a workflow allowing a responsible party to indicate that the idle content item is to be dispositioned or is a false positive; and
    modifying the content usage file, in the event of a false positive, to generate a rule excluding the idle content item from being identified in a further analysis as idle content item or excluding a group of content items having common metadata or taxonomy as the idle content item from being identified as idle content items.

12. The method of claim 11, wherein when the workflow is triggered it recommends a disposition action to the responsible party and further comprising:
    receiving, from the responsible party, an instruction to perform the disposition action on the idle content item;
    performing the disposition action on the idle content item; and
    wherein the disposition action is one of deleting the idle content item from the content repository, archiving the idle content item in secondary storage, and recycling the content item for the next analysis trigger.

13. A non-transitory computer readable storage medium, including instructions stored thereon, which when read and executed by one or more microprocessors cause the one or more microprocessors to perform the steps comprising:

accessing the content management system, wherein the content management system includes a content repository and a content usage analyzer;

capturing audit data related to operations performed on content items stored in the content repository and storing the captured audit data separately from the content items;

storing the captured audit data for each individual operation;

analyzing the captured audit data, in response to a time-based analysis trigger, using the content usage analyzer to determine a content usage pattern, over time, of the content items of the content repository based on the stored audit data; and identifying an idle content item stored within the content repository based on the content usage pattern.

14. The non-transitory computer readable storage medium of claim 13, wherein when the content management system includes a content usage policy file, the non-transitory computer readable storage medium further includes instructions stored thereon, which when read and executed by one or more microprocessors cause the one or more microprocessors to perform the steps further comprising:

accessing the content usage policy file when analyzing the audit data for each of the content items; and wherein the content usage policy file includes rules usable by the content usage analyzer to identify the idle content item.

15. The non-transitory computer readable storage medium of claim 14 further including instructions stored thereon, which when read and executed by one or more microprocessors cause the one or more microprocessors to perform the steps further comprising:

generating a workflow allowing a responsible party to indicate that the idle content item is to be dispositioned or is a false positive; and modifying the content usage file to generate a rule excluding the content item as an idle content item or a group of content items having comment metadata or taxonomy as idle content items based on the false positive.

16. The non-transitory computer readable storage medium of claim 14, further including instructions stored thereon, which when read and executed by one or more microprocessors cause the one or more microprocessors to perform the step further comprising:

receiving, from the responsible party, an instruction to perform a disposition action on the idle content item;

performing the disposition action on the idle content item; and wherein the disposition action is one of deleting the idle content item from the content repository, archiving the idle content item in secondary storage, and recycling the content item for the next analysis trigger.

17. The content management system of claim 1, where the operation includes one or more of check in, update, edit, print, save, view, archive, modify metadata, convert, delete, create, and move.

\* \* \* \* \*

UNITED STATES PATENT AND TRADEMARK OFFICE
CERTIFICATE OF CORRECTION

PATENT NO. : 8,812,464 B2
APPLICATION NO. : 13/484019
DATED : August 19, 2014
INVENTOR(S) : Sambamurthy et al.

Page 1 of 1

It is certified that error appears in the above-identified patent and that said Letters Patent is hereby corrected as shown below:

On title page, column 2, References Cited under Other Publications, line 1, delete "Coporation," and insert -- Corporation, --, therefor.

On title page, column 2, References Cited under Other Publications, line 3, delete "Coporation," and insert -- Corporation, --, therefor.

In the Drawings

On sheet 2 of 2, in figure 2, under Reference Numeral 202, line 1, delete "con tent" and insert -- content --, therefor.

On sheet 2 of 2, in figure 2, under Reference Numeral 204, line 2, delete "re pository" and insert -- repository --, therefor.

On sheet 2 of 2, in figure 2, under Reference Numeral 206, line 1, delete "co ntent" and insert -- content --, therefor.

On sheet 2 of 2, in figure 2, under Reference Numeral 208, line 2, delete "captu red" and insert -- captured --, therefor.

Signed and Sealed this
Seventeenth Day of March, 2015

Michelle K. Lee
*Director of the United States Patent and Trademark Office*

UNITED STATES PATENT AND TRADEMARK OFFICE
CERTIFICATE OF CORRECTION

Page 1 of 2

PATENT NO.        : 8,812,464 B2
APPLICATION NO.   : 13/484019
DATED             : August 19, 2014
INVENTOR(S)       : Sambamurthy et al.

It is certified that error appears in the above-identified patent and that said Letters Patent is hereby corrected as shown below:

On the Title Page

Column 2, References Cited under Other Publications, line 1, delete "Coporation," and insert -- Corporation, --, therefor.

Column 2, References Cited under Other Publications, line 3, delete "Coporation," and insert -- Corporation, --, therefor.

In the illustrative figure, under Reference Numeral 202, line 1, delete "con tent" and insert -- content --.

In the illustrative figure, under Reference Numeral 204, line 2, delete "re pository" and insert -- repository --.

In the illustrative figure, under Reference Numeral 206, line 1, delete "con tent" and insert -- content --.

In the illustrative figure, under Reference Numeral 208, line 2, delete "captu red" and insert -- captured --.

In the Drawings

On sheet 2 of 2, in figure 2, under Reference Numeral 202, line 1, delete "con tent" and insert -- content --, therefor.

This certificate supersedes the Certificate of Correction issued March 17, 2015.

Signed and Sealed this
Fourteenth Day of April, 2015

Michelle K. Lee
*Director of the United States Patent and Trademark Office*

CERTIFICATE OF CORRECTION (continued)
U.S. Pat. No. 8,812,464 B2

On sheet 2 of 2, in figure 2, under Reference Numeral 204, line 2, delete "re pository" and insert -- repository --, therefor.

On sheet 2 of 2, in figure 2, under Reference Numeral 206, line 1, delete "co ntent" and insert -- content --, therefor.

On sheet 2 of 2, in figure 2, under Reference Numeral 208, line 2, delete "captu red" and insert -- captured --, therefor.